(12) United States Patent
Iwafuchi et al.

(10) Patent No.: US 11,669,591 B2
(45) Date of Patent: Jun. 6, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Toshihiro Iwafuchi, Kanagawa (JP); Chizuru Ohsawa, Kanagawa (JP); Masashi Morimoto, Kanagawa (JP); Yusuke Izumisawa, Kanagawa (JP); Mami Yokohashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/224,128

(22) Filed: Apr. 7, 2021

(65) Prior Publication Data

US 2022/0092363 A1    Mar. 24, 2022

(30) Foreign Application Priority Data

Sep. 18, 2020 (JP) .............................. JP2020-157247

(51) Int. Cl.
*G06F 18/21* (2023.01)
*G06T 7/00* (2017.01)

(52) U.S. Cl.
CPC ........ *G06F 18/2193* (2023.01); *G06T 7/0004* (2013.01); *G06T 2207/30144* (2013.01); *G06T 2207/30168* (2013.01)

(58) Field of Classification Search
CPC .............. G06K 9/6265; G06T 7/0004; G06T 2207/30144; G06T 2207/30168
See application file for complete search history.

(56) References Cited

U.S. PATENT DOCUMENTS

| | | | |
|---|---|---|---|
| 8,750,610 B2 | 6/2014 | Okutsu et al. | |
| 10,303,983 B2 | 5/2019 | Tsunoda | |
| 2014/0072170 A1* | 3/2014 | Zhang | G06V 40/103 382/103 |
| 2017/0372456 A1* | 12/2017 | Lee | G06T 5/10 |
| 2019/0065996 A1 | 2/2019 | Matsuki | |
| 2020/0160062 A1* | 5/2020 | Cho | G06T 7/0002 |
| 2022/0060619 A1* | 2/2022 | Pinhasov | G06V 20/10 |

FOREIGN PATENT DOCUMENTS

| | | |
|---|---|---|
| JP | 2013021534 | 1/2013 |
| JP | 2017005389 | 1/2017 |
| JP | 2019046058 | 3/2019 |

* cited by examiner

*Primary Examiner* — David Perlman
(74) *Attorney, Agent, or Firm* — JCIPRNET

(57) ABSTRACT

An information processing apparatus includes a processor configured to infer an object represented in image data to be processed, the object being inferred by using a learning model for inferring the object represented in the image data, and perform image processing on the image data with a correction level of the image processing for correcting the image data being varied on a basis of a probability of correctness in inference of the object.

18 Claims, 14 Drawing Sheets

FIG. 3

```
START
  ↓
ANALYZE EACH OBJECT IN IMAGE — S01
  ↓
DECIDE IMAGE PROCESSING — S02
  ↓
DECIDE CORRECTION LEVEL — S03
  ↓
PERFORM IMAGE PROCESSING — S04
  ↓
END
```

FIG. 4

| SCENE | CORRECTNESS PROBABILITY | IMAGE PROCESSING |
|---|---|---|
| INDOOR | 0.0 | WHITE BALANCE ADJUSTMENT |
| OUTDOOR (WITHOUT SKY) | 1.0 | CONTRAST ADJUSTMENT |
| OUTDOOR (WITH SKY) | 0.0 | SKY MEMORY COLOR CORRECTION |

| OBJECT | CORRECTNESS PROBABILITY | IMAGE PROCESSING |
|---|---|---|
| PERSON | 1.0 | SKIN MEMORY COLOR CORRECTION |
| GLOSSY ARTICLE | 0.6 | SHARPNESS |
| MATTE ARTICLE | 0.4 | SMOOTHING |
| FOOD | 0.0 | SATURATION ENHANCEMENT |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-157247 filed Sep. 18, 2020.

BACKGROUND

(i) Technical Field

The present disclosure relates to an information processing apparatus and a non-transitory computer readable medium.

(ii) Related Art

When image data is output (for example, when printing is performed on the basis of image data), image processing for correcting the image data (such as smoothing, saturation correction, or skin tone correction) is performed on occasions.

Japanese Unexamined Patent Application Publication No. 2013-21534 describes a device that analyzes image data and uses the analysis result to correct white balance.

Japanese Unexamined Patent Application Publication No. 2019-46058 describes an apparatus that formulates a classification model. The apparatus calculates a learning data reliability level that is the reliability level of learning data including classification target data and a label associated with the classification target data. The apparatus calculates the learning data reliability level on the basis of a first reliability level that ds a reliability level of the classification target data and a second reliability level that is the reliability level of the label. The apparatus labels the classification target data on the basis of pieces of learning data and learning data reliability levels.

Japanese Unexamined Patent Application Publication No. 2017-5389 describes an apparatus that segments an image into subregions on the basis of subsidiary information associated with the image data, extracts a feature value of each of the subregions obtained through the segmentation, and determines a category for each subregion on the basis of the extracted feature value.

SUMMARY

A conceivable way of correcting image data to output more favorable image data (such as image data having impression similar to impression intended by a user or image data representing an object vividly) is determining a feature of the image data (such as color or a scene (for example, an indoor scene or an outdoor scene)) and then performing correction based on the feature on the image data in accordance with a certain fixed level of correction. However, if the image data is complicated (such as a case where the image data represents multiple objects or a case where an object or a scene is difficult to determine), the feature is wrongly determined in some cases. In such cases, since the image data is corrected on the basis of the wrong determination or does not undergo correction that is to be performed on the image data, more favorable image data is not necessarily obtained.

Aspects of non-limiting embodiments of the present disclosure relate to performing image processing for correcting image data suitably for the image data as compared to correcting the image data in accordance with a fixed correction level at any time.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including a processor configured to infer an object represented in image data to be processed, the object being inferred by using a learning model for inferring the object represented in the image data, and perform image processing on the image data with a correction level of the image processing for correcting the image data being varied on a basis of a probability of correctness in inference of the object.

BRIEF DESCRIPTION OF THE DRAWINGS

An exemplary embodiment of the present disclosure will be described in detail based on the following figures, wherein:

FIG. 3 is a flowchart illustrating processing by the image processing apparatus according to this exemplary embodiment;

FIG. 4 illustrates tables of example results of inference from image data;

DETAILED DESCRIPTION

Figure 1:
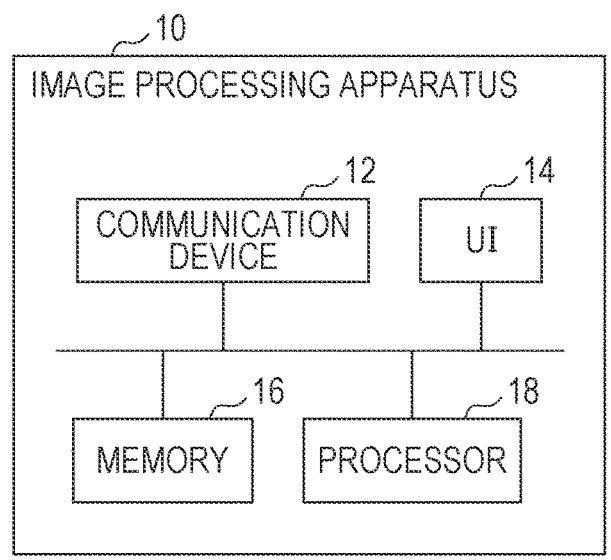
FIG. 1 is a block diagram illustrating the configuration of the hardware of an image processing apparatus according to this exemplary embodiment.

An image processing apparatus according to this exemplary embodiment will be described with reference to FIG. 1. FIG. 1 illustrates an example configuration of the hardware of an image processing apparatus 10 according to this exemplary embodiment.

The image processing apparatus 10 is an example of the information processing apparatus and may be, for example, a workstation, a personal computer (hereinafter, referred to as a PC), a tablet PC, a smartphone, or other apparatuses (such as a printer, a scanner, and a multifunction printer including these apparatus). The image processing apparatus 10 may be incorporated in an apparatus such as the printer or the multifunction printer.

The image processing apparatus 10 receives image data via a communication path such as the Internet or a local area network (LAN) or a storage medium, performs image processing on the received image data, and outputs the image data having undergone the image processing. For example, the image data having undergone the image processing may be output for printing to a printer or a multifunction printer, output for displaying to the display, or stored in the memory of the image processing apparatus 10 or an external apparatus.

As illustrated in FIG. 1, the image processing apparatus 10 includes, for example, a communication device 12, a user interface (UI) 14, a memory 16, and a processor 18.

The communication device 12 is a communication interface having communication chips, communication circuits, and other components and has functions of transmitting information to a different apparatus and receiving information transmitted from a different apparatus. Communication by the communication device 12 may be wired or wireless communication.

The UI 14 includes a display and an operation device. The display is a liquid crystal display, an electroluminescence (EL) display, or the like. The operation device is a keyboard, an input key pad, a mouse, an operation panel, or other devices. The UI 14 may be a UI such as a touch panel serving as the display and the operation device.

The memory 16 is a device having one or more memory areas for storing various pieces of information. The memory 16 is, for example, a hard disk drive, any of various memories (such as a random-access memory (RAM), a dynamic RAM (DRAM), or a read only memory (ROM)), any of other storages (such as an optical disk), or a device having combination of these devices. The image processing apparatus 10 includes one or more memories 16.

The processor 18 is configured to control the operation of the components of the image processing apparatus 10. The processor 18 may have a memory.

For example, the processor 18 is configured to infer an object represented in image data to be processed. The processor 18 infers the object by using a learning model for inferring the object represented in the image data. The processor 18 is also configured to perform image processing on the processing target image data with a correction level of the image processing for correcting the processing target image data being varied on the basis of the inference correctness probability of the object. The processor 18 also decides image processing appropriate for the inferred object.

Figure 2:
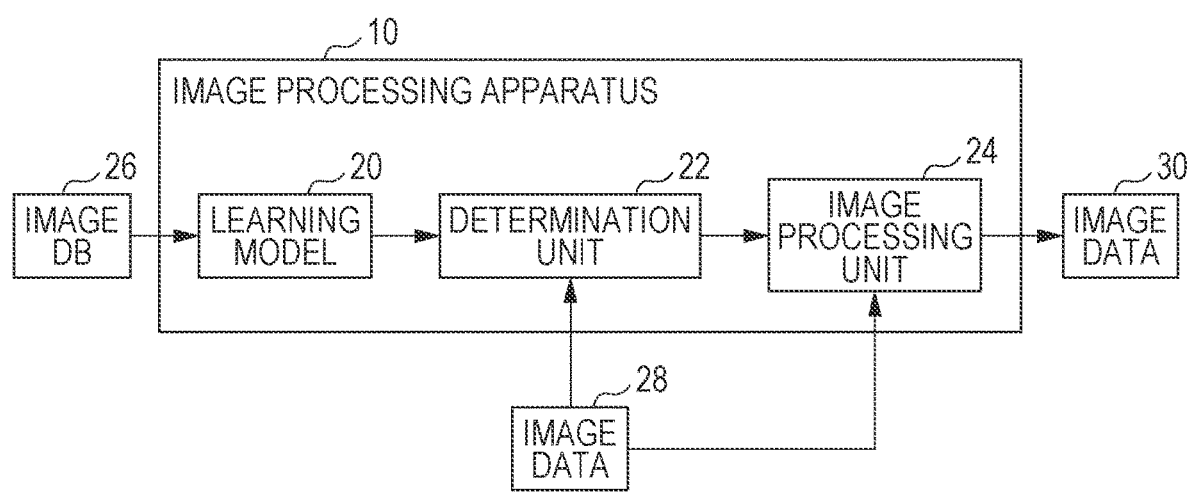
FIG. 2 is a block diagram illustrating the functional configuration of the image processing apparatus according to this exemplary embodiment.

Hereinafter, the processing by the processor 18 will be described in detail with reference to FIG. 2. FIG. 2 illustrates an example functional configuration of the image processing apparatus 10.

The image processing apparatus 10 includes, for example, a learning model 20, a determination unit 22, and an image processing unit 24. The processing using the learning model 20, the determination unit 22, and the image processing unit 24 are implemented by the processor 18. To implement these, the memory 16 may be used.

The learning model 20 is a model for inferring an object represented in the image data and is a machine learning model such as a deep learning model. It goes without saying that a model other than the machine learning model may be used as the learning model 20. A publicly known learning model may also be used. The learning model 20 is generated by learning pieces of image data, for example, stored in an image database (DB) 26. The image DB 26 stores pieces of image data for the learning to infer the object. The learning model 20 is generated by learning the pieces of image data. The learning model 20 may be generated by using, as the learning image data, image data acquired through a communication path such as the Internet.

The determination unit 22 is configured to receive image data 28 serving as a processing target and infer an object represented in the image data 28 by using the learning model 20. To infer the object, artificial intelligence (AI) may also be used. The inferred object may be any object. For example, the object is a person, an animal other than a person, a plant, or a solid body such as a building or a vehicle. The concept of an object may include a scene represented in the image data. The scene is, for example, an indoor scene, an outdoor scene, or scenery. The learning model 20 is generated to infer these objects from the image data 28. The processing target image data 28 is designated, for example, by a user. It goes without saying that the processing target image data 28 may be selected in a different manner from the designation by the user.

The determination unit 22 calculates an inference correctness probability of the inferred object. The inference correctness probability is a probability of inference, that is, how high the probability of inference is. The processing by the determination unit 22, that is, the processing for inferring an object by using the learning model 20 may use publicly known technology. For example, exclusive prediction or multi-label prediction is used for the processing for inferring an object.

The exclusive prediction is prediction processing in which the correctness probabilities of respective objects are calculated such that a total of the correctness probabilities of all of objects inferred from the image data 28 is a value of 1.0 (that is, 100%).

The multi-label prediction is prediction processing in which the correctness probabilities of respective objects represented in the image data 28 are calculated individually and a total of the correctness probabilities of all of the objects is not necessarily 1.0. In the multi-label prediction, for example, a probability higher than or equal to a predetermined probability (that is, a threshold) obtained as a result of inference of an object may be used as the result of the inference.

The determination unit 22 decides image processing appropriate for the object inferred from the image data 28.

The image processing is processing for correcting the image data 28. For example, image processing to be performed is specified in advance on a per-object basis, and information indicating association between an object and image processing to be performed on the object is stored in advance in the memory 16. The image processing is, for example, white balance adjustment, contrast adjustment, sharpness adjustment, smoothing, saturation enhancement, or correction of the color of an object (such as skin color correction or sky color correction). The concept of the image processing according to this exemplary embodiment may include processing other than the processing described above, as a matter of course. For example, image processing to be performed on the object "person" flesh color correction or smoothing; the object "sky", sky color correction or smoothing; the object "metal", sharpness adjustment; the object "food", saturation correction; and the object "animal", sharpness adjustment.

The image processing unit 24 is configured to perform image processing decided by the determination unit 22 for the processing target image data 28 (that is, processing for correcting image data). For example, the image processing unit 24 performs image processing appropriate for an object inferred from the image data 28 for each object. The image processing unit 24 performs image processing for correcting image data on the image data 28 in such a manner as to vary a correction level on the basis of the inference correctness probability of the object.

The correction level may be decided on the basis of the degree of correction, the amount of correct on, or the like. For example, the correction level is obtained by multiplying a predetermined reference level (for example, a level for an inference correctness probability of 1.0) by an adjustment amount based on the probability. The multiplication is performed by the determination unit 22.

When the probability and the adjustment amount have a linear relationship of 1:1, the adjustment amount corresponds to the value of the probability itself, and multiplying the reference level by the adjustment amount corresponds to multiplying the reference level by the probability value. For example, when the inference correctness probability of the object is 1.0 (100%), the object represented in the image data 28 is corrected by using the highest level. In contrast, when the inference correctness probability of the object is 0.0 (that is, 0%), the object represented in the image data 28 is not corrected. When the inference correctness probability of the object is 0.5 (that is, 50%), the object represented in the image data 28 is corrected by using a half level of the highest level.

When the probability and the adjustment amount do not have the linear relationship of 1:1 (for example, when the relationship is represented in a step-wise or curved form), a correction level to be applied to the object is calculated in such a manner that an adjustment amount based on the probability is decided and then the decided adjustment amount is multiplied by a reference level.

The determination unit 22 may calculate the correction level to be applied to the inferred object every time the object is inferred from the image data 28. In another example, a correction level based on an inference correctness probability may be specified in advance. In this case, the determination unit 22 does not calculate the correction level every time. For example, a correction curve representing correction levels for correctness probabilities, a filter, or the like may be specified in advance.

In addition, color conversion processing to be applied to the image data 28 may be performed on the image data 28 as the image processing for correcting the image data 28. The color conversion processing is performed, for example, by using a lookup table (LUT). For example, the determination unit 22 may perform calculation for a LUT for inference correctness probabilities, or a LUT may be provided for each probability in advance. The image processing unit 24 may perform the color conversion of the image data 28 by applying the LUT for the probabilities to the image data 28.

The image processing unit 24 performs the image processing on the processing target image data 28, and thereby image data 30 is generated. The image data 30 may be output for printing to, for example, a printer or a multifunction printer, may be output for displaying to the display, and may be stored in the memory.

Hereinafter, example flow of processing by the image processing apparatus 10 will be described with reference to FIG. 3. FIG. 3 illustrates a flowchart of the processing.

First, the determination unit 22 receives processing target image data 28 and analyzes the processing target image data 28 by using the learning model 20 (S01). In more detailed explanation, the determination unit 22 infers objects represented in the processing target image data 28 and calculates an inference correctness probability for each object.

The determination unit 22 decides image processing to be performed on the inferred object (S02). The determination unit 22 also decides a correction level based on the inference correctness probability for each object (S03). Steps S02 and S03 may be performed in the reverse order or may be performed simultaneously.

The image processing unit 24 performs the image processing decided by the determination unit 22 on the processing target image data 28 in accordance with the correction level decided by the determination unit 22 (S04). That is, the image processing unit 24 perform the image processing on the processing target image data 28 in such a manner as to vary the image processing depending on the object. Image data 30 is thereby generated.

The image processing is decided for each object, and the image processing appropriate for the object is performed in accordance with the level based on the inference correctness probability. These leads to, for example, representing the object with its feature emphasized (for example, the skin of a person or a sky color is expressed in a color more similar to an idealistic color), or representing an object outlined more clearly, or representing an object more vividly. It goes without saying that these are merely examples, and a result according to the performed image processing is obtained.

Hereinafter, this exemplary embodiment will be described by taking specific examples.

The results of inference from the image data 28 will be described with reference to FIG. 4. FIG. 4 illustrates scenes and objects inferred from the image data 28 by the determination unit 22. Specifically, FIG. 4 illustrates an inference correctness probability of each scene and each object and also illustrates image processing to be performed on the scene and the object.

The inference correctness probability of each of an indoor scene, an outdoor scene without the sky, and an outdoor scene with the sky has been calculated as the inference correctness probability of a scene represented in the image data 28. The inference correctness probability of the scene is a result of processing with, for example, the exclusive prediction. The correctness probability of the scene "indoor scene" is 0.0 (0.0%); the scene "outdoor scene without the sky", 1.0 (100%); and the scene "outdoor scene with the sky", 0.0 (0.0%). That is, the outdoor scene without the sky is inferred as the scene represented in the image data 28.

Image processing associated with the scene "indoor scene" is white balance adjustment; the scene "outdoor scene without the sky", contrast adjustment; and the scene "outdoor scene with the sky", sky memory color correction. In the example illustrated in FIG. 4, since the correctness probability of the scene "outdoor scene without the sky" is 1.0, the contrast adjustment is performed on the scene represented in the processing target image data 28 in accordance with the correction level based on the correctness probability of 1.0. Since the correctness probability of each of the scene "indoor scene" and the scene "outdoor scene without the sky" is 0.0, the white balance adjustment and the sky color correction are not performed on the processing target image data 28.

The inference correctness probability of each of the objects "person", "glossy article", "matte article", and "food" has been calculated as the inference correctness probability of an object represented in the image data 28. The inference correctness probability of the object is a result of processing with, for example, the multi-label prediction. The correctness probability of the object "person" is 1.0 (100%); the object "glossy article", 0.6 (60%); the object "matte article", 0.4 (40%); and the object "food", 0.0 (0.0%). For example, the image data 28 represents the object "person" with a probability of 100%, the object "glossy article" with a probability of 60%, the object "matte article" with a probability of 40%, and the object "food" with a probability of 0%.

Image processing associated with the object "person" is skirl memory color correction; the object "glossy article", sharpness adjustment; the object "matte article", smoothing; and the object "food", saturation enhancement. In the example illustrated in FIG. 4, the object "person" inferred as an object represented in the processing target image data 28 undergoes the skin memory color correction in accordance with the correction level based on the correctness probability of 1.0. The object "glossy article" inferred as an object represented in the processing target image data 28 undergoes the sharpness adjustment in accordance with the correction level based on the correctness probability of 0.6. The object "matte article" inferred as an object represented in the processing target image data 28 undergoes the smoothing in accordance with the correction level based on the correctness probability of 0.4. Since the object "food" is inferred as an object not represented in the processing target image data 28, the saturation enhancing is not performed.

Hereinafter, relationships between an inference correctness probability and an adjustment amount for deciding a correction level will be described.

Figure 5:
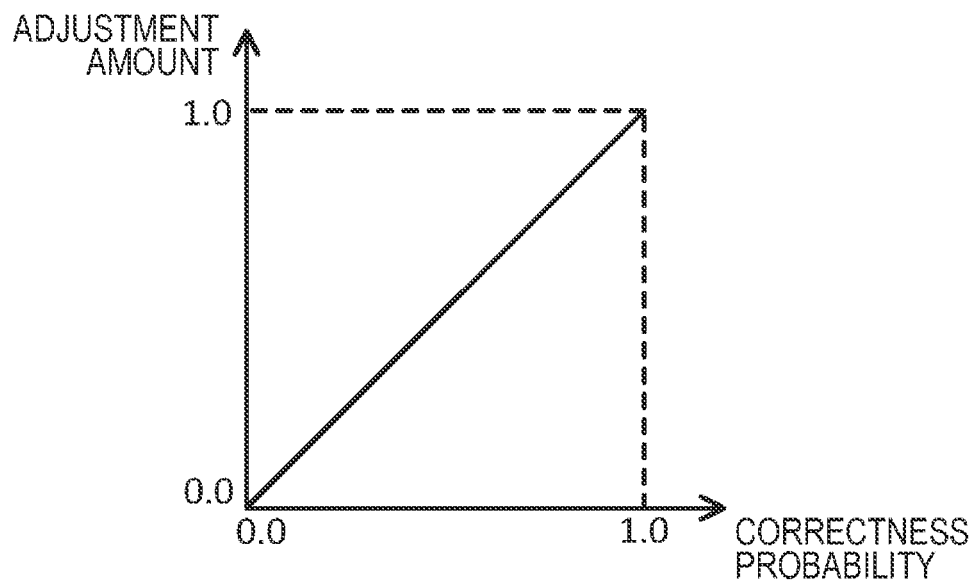
FIG. 5 is a graph illustrating a relationship between a correctness probability in inference (inference correctness probability) and an adjustment amount.

FIG. 5 illustrates an example of a graph representing a relationship between an inference correctness probability and an adjustment amount. The horizontal axis of the graph in FIG. 5 represents inference correctness probability, while the vertical axis represents adjustment amount.

In the example illustrated in FIG. 5, the inference correctness probability and the adjustment amount have a linear relationship of 1:1. The higher the correctness probability, the larger the adjustment amount. In this case, for example, when the correctness probability is 0.0, the adjustment amount is 0.0. When the correctness probability is 1.0, the adjustment amount is 1.0.

A correction level for image processing to be performed on an object is calculated by multiplying the adjustment amount based on the correctness probability of the object by the predetermined reference correction level. As the correctness probability increases, the adjustment amount increases linearly. As the result, the correction level raises. In other words, as the correctness probability lowers, the adjustment amount decreases linearly. As the result, the correction level lowers.

Figure 6:
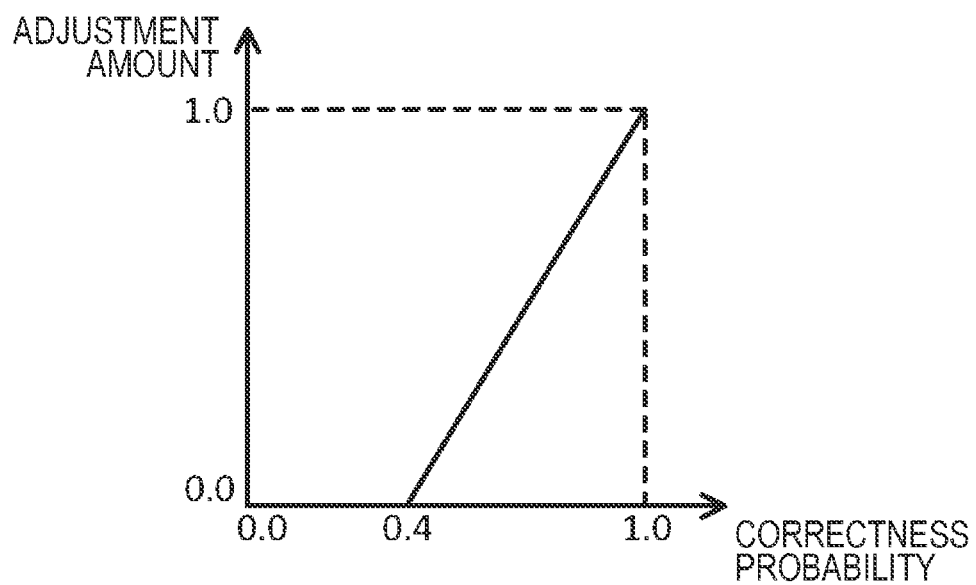
FIG. 6 is a graph illustrating a relationship between an inference correctness probability and an adjustment amount.

FIG. 6 illustrates a graph representing another relationship between an inference correctness probability and an adjustment amount. In the example illustrated in FIG. 6, when a correctness probability is in a range from 0.0 to 0.4, the adjustment amount is fixed at 0.0. When a correctness probability is in a range from 0.4 to 1.0, the adjustment amount increases linearly relative to the correctness probability. That is, when a correctness probability is in the range from 0.0 to 0.4, image processing is not performed on an object having the probability. When a correctness probability is in the range from 0.4 to 1.0, the adjustment amount increases linearly with the increase of the correctness probability. As the result, the correction level raises. When a correctness probability is 1.0, the adjustment amount is 1.0. The probability range having a fixed adjustment amount may be changed by the user.

Figure 7:
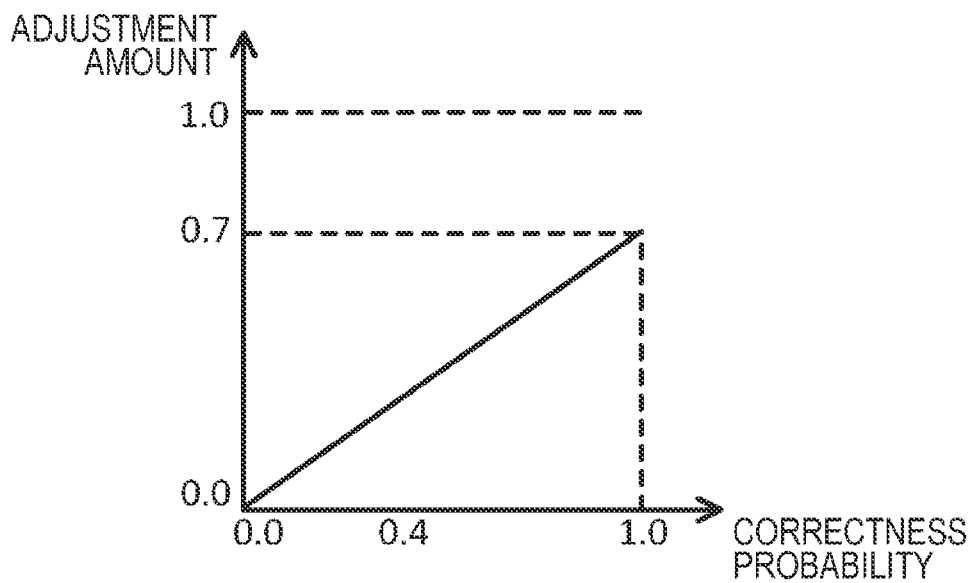
FIG. 7 is a graph illustrating a relationship between an inference correctness probability and an adjustment amount.

FIG. 7 illustrates a graph representing still another relationship between an inference correctness probability and an adjustment amount. In the example illustrated in FIG. 5, the maximum value of the adjustment amount is 1.0; however, as illustrated in FIG. 7, the maximum value of the adjustment amount may be a value lower than 1.0 (for example, 0.7). The same applies to the example illustrated in FIG. 6. The maximum value of the adjustment amount may be changed by the user.

Figure 8:
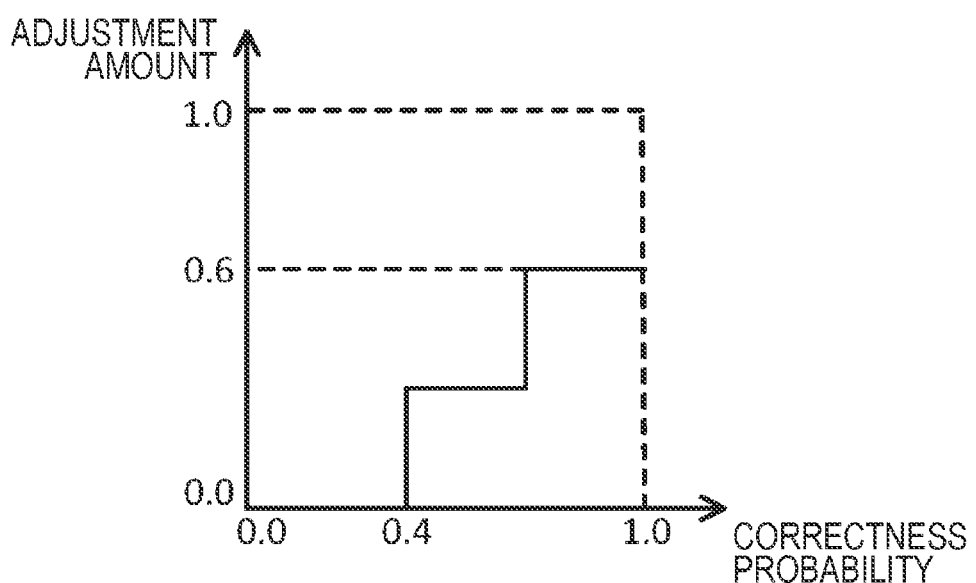
FIG. 8 is a graph illustrating a relationship between an inference correctness probability and an adjustment amount.

FIG. 8 illustrates a graph representing still another relationship between an inference correctness probability and an adjustment amount. In the example illustrated in FIG. 8, the adjustment amount varies stepwise relative to the correctness probability. For example, when a correctness probability is in a range from 0.0 to 0.4, the adjustment amount is 0.0, and thus image processing is not performed on an object having the probability. When a correctness probability is in a range from 0.4 to 0.7, the adjustment amount is fixed at 0.3, and image processing is performed on an object having the probability in accordance with the correction level based on the adjustment amount. When a correctness probability is in a range from 0.7 to 1.0, the adjustment amount is fixed at 0.6, and image processing is performed on an object having the probability in accordance with the correction level based on the adjustment amount. These numerical values are merely examples and may be changed by the user.

The examples illustrated in FIGS. 5 to 8, each graph is a linear graph (that is, a graph in a straight line form); however, the graph may be a nonlinear graph (for example, a curved graph) or a graph including a straight line and a curve. For example, the graph may be any graph not having a downward convex shape.

The relationships illustrated in FIGS. 5 to 8 are merely examples. For example, a first adjustment amount based on a first correctness probability is larger than a second adjustment amount based on a second probability that is lower than the first probability. An adjustment amount based on a probability in a range from the second probability to the first probability may be fixed or may increase in the range from the second probability to the first probability. That is, in a relationship between a correctness probability and an adjustment amount, the correctness probability range in which the adjustment amount is fixed may be defined or does not have to be defined. Regardless or whether the probability range having a fixed adjustment amount is defined, the adjustment amount increases as a whole relative to the correctness probability.

The determination unit 22 may vary the correction level depending on the object represented in the processing target image data 28. Even if the same image processing is to be performed, the determination unit 22 may vary the correction level depending on the object. For example, the determination unit 22 varies the adjustment amount based on the inference correctness probability depending on the object. In a specific example for explanation, the determination unit 22 may vary the adjustment amount depending on whether the object is a flower or a food. For example, when any one of the graphs in FIGS. 5 to 8 is used, the maximum value of the adjustment amount for the object "flower" may be 0.9, and the maximum value of the adjustment amount for the object "food" may be 1.0. Since the intensity or the like of color to be represented varies depending on the object, the adjustment amount may be decided for each object with such a condition taken into consideration. In another example, the maximum value of the adjustment amount may vary depending on whether the object represented in the image data 28 is the scene "daytime" or the scene "night". When the adjustment amount varies depending on the object, the correction level thereby varies depending on the object. For the color conversion processing to be performed as the image processing, the determination unit 22 may use a different LUT used to the color conversion processing, depending on the object.

Hereinafter, specific examples of the image processing will be described.

Figure 9:
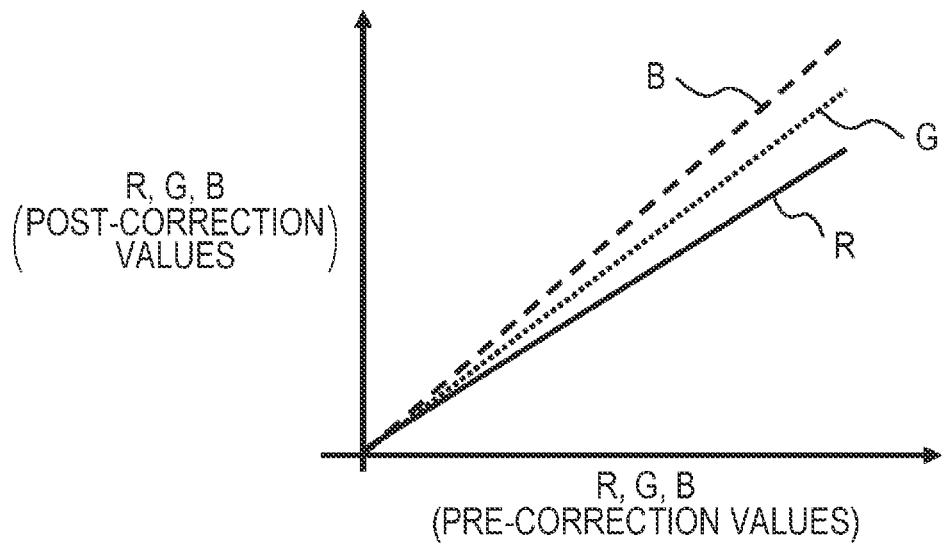
FIG. 9 is a graph illustrating a specific example of image processing.
Figure 10:
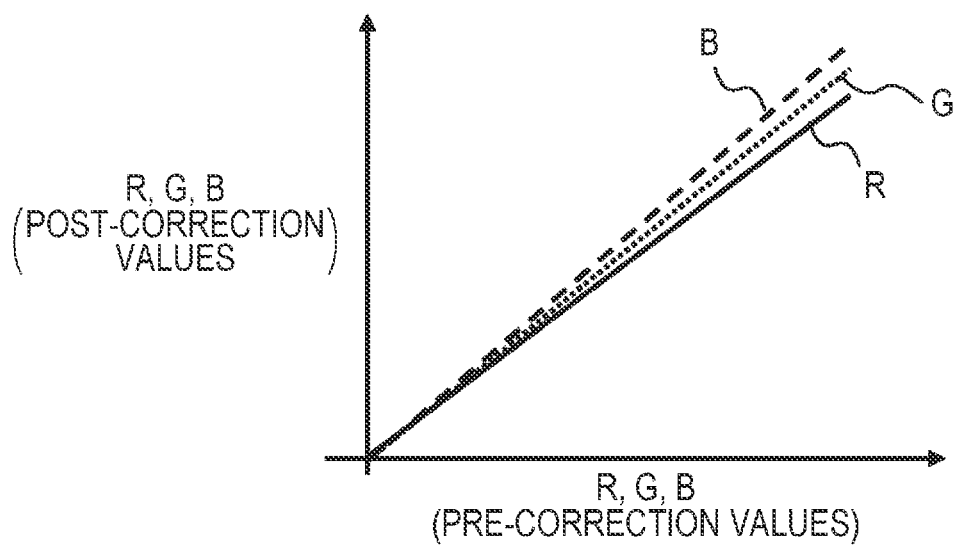
FIG. 10 is a graph illustrating a specific example of the image processing.
Figure 11:
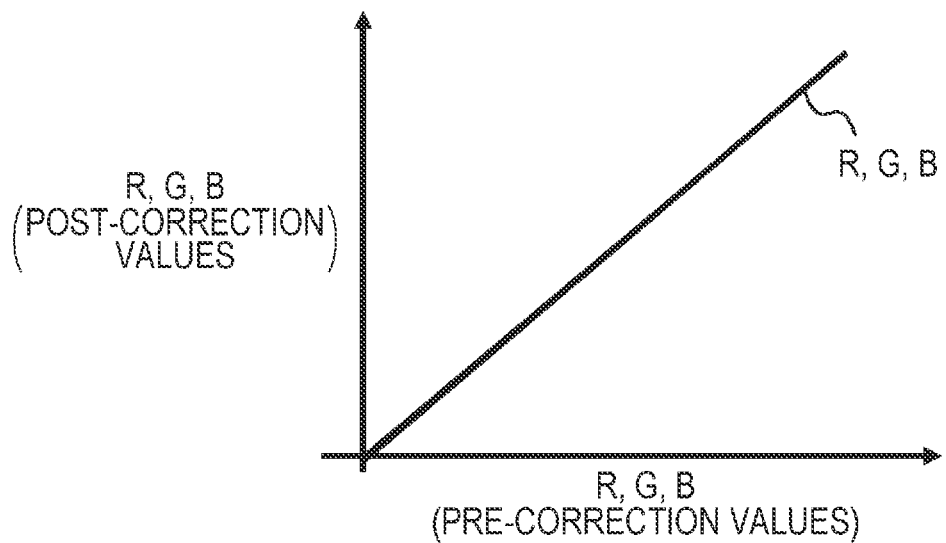
FIG. 11 is a graph illustrating a specific example of the image processing.

The white balance adjustment that is an example of the image processing will be described with reference to FIGS. 9 to 11. FIGS. 9 to 11 each illustrate pre-correction pixel values (that is, pixel values before the white balance adjustment is performed) and post-correction pixel values (that is, pixel values after the white balance adjustment is performed). The horizontal axis represents pre-correction pixel values, while the vertical axis represents post-correction pixel values. In an example of the pixel values, the respective values of red (R), green (G), and blue (B) are herein used. In another example, the respective values of yellow (Y), magenta (M), cyan (C), black (K), and other colors may be used.

In each graph in FIGS. 9 to 11, the solid line represents a relationship between a pre-correction R value and a post-correction R value; the dotted line, a relationship between a pre-correction G value and a post-correction G value; and the broken line, a relationship between a pre-correction B value and a post-correction B value.

FIG. 9 illustrates a graph for white balance adjustment with the inference correctness probability of 1.0 (100%). The graph illustrated in FIG. 9 is obtained in such a manner that, for example, the adjustment amount is 1.0 and that the reference correction level for the white balance adjustment is multiplied by the adjustment amount of 1.0. The post-correction R, G, and B values with the correctness probability of 1.0 are respectively different from rile pre-correction R, G, and B values. Performing the white balance adjustment thus results in pixel values different from those before the white balance adjustment. The graph illustrated in FIG. 9 is a linear graph (graph in the straight line form) but may be a nonlinear graph (for example, a curved graph) or a graph including a straight line and a curve. A LUT corresponding to the graph illustrated in FIG. 9 may be prepared in advance. For example, if the image is orange as a whole, the R and G values are lowered by performing the white balance adjustment. The white balance adjustment method is merely an example, and a different publicly known method is also usable.

FIG. 10 illustrates a graph for white balance adjustment with the inference correctness probability of 0.5 (50%). The graph illustrated in FIG. 10 is obtained in such a manner that, for example, the adjustment amount is 0.5 and that the reference correction level for the white balance adjustment is multiplied by the adjustment amount of 0.5. For example, a correction level for the white balance adjustment with the correctness probability of 0.5 is a half of the correction level for the white balance adjustment with the correctness probability of 1.0. The half value is merely an example, and the correction level may be decided by using a correction function or the like. The post-correction R, G, and B values with the correctness probability of 0.5 are respectively different from the pre-correction correction R, G, and B values. Performing, the white balance adjustment thus results in pixel values different from those before the white balance adjustment. The graph illustrated in FIG. 10 is a linear graph (graph in the straight line form) but may be a nonlinear graph (for example, a curved graph) or a graph including a straight line and a curve. A LUT corresponding to the graph illustrated in FIG. 10 may be prepared in advance.

FIG. 11 illustrates a graph for white balance adjustment with the inference correctness probability of 0.0 (0.0%). The adjustment amount is 0.0, and the correction level for the white balance adjustment is 0.0. The post-correction R, U, and B values are identical to the pre-correction R, G, and B values. That is, an object having the correctness probability of 0.0 does not undergo the white balance adjustment.

Also in a case where the correctness probability is other than the probabilities described above, a graph for white balance adjustment is generated on the basis of the adjustment amount based on the probability.

When the inference correctness probability of an object to undergo the white balance adjustment is 1.0, the image processing, unit 24 performs the white balance adjustment on the object on the basis of the graph illustrated in FIG. 9. In more detailed explanation, the image processing unit 24 receives processing target image data 28 as pre-correction image data and changes the R value (pre-correction R value) of the object represented in the image data 28 and to undergo the white balance adjustment to a post-correction R value on the basis of the relationship between the pre-correction R value and the post-correction R value. That is, the image processing unit 24 receives the pre-correction value as an input value and outputs, as an output value, the post-correction R value associated with the pre-correction R value. Likewise, the image processing unit 24 changes the pre-correction G value to a post-correction G value on the basis of the relationship between the pre-correction G value and the post-correction G value. That is, the image processing unit 24 receives the pre-correction G value as an input value and outputs, as an output value, the post-correction G value associated with the pre-correction G value. Likewise, the image processing unit 24 changes the pre correction B value to a post-correction B value on the basis of the relationship between the pre-correction B value and the post-correction B value. That is, the image processing unit 24 receives the pre-correction. B value as an input value and outputs, as an output value, the post-correction B value associated with the pre-correction B value. The image processing unit 24 generates and outputs image data 30 having the post-correction R, G, and B values.

When the inference correctness probability of the object to undergo the white balance adjustment is 0.5, the image processing unit 24 performs the white balance adjustment on the object on the basis of the graph illustrated in FIG. 10. In the same manner as in the case where the correctness probability is 1.0, the image processing unit 24 changes the respective pre-correction R, G, and B values to post-correction R, G, and B values and outputs image data 30 having the post-correction R, B, and B values.

When the inference correctness probability of the object to undergo the white balance adjustment is 0.0, the image processing unit 24 does not perform the white balance adjustment. That is, the pre-correction R, B, and B values (that is, input values) are identical to the post-correction R, G, and B values (that is, output values), and the image processing unit 24 outputs the input values as the output values without changing.

Figure 12:
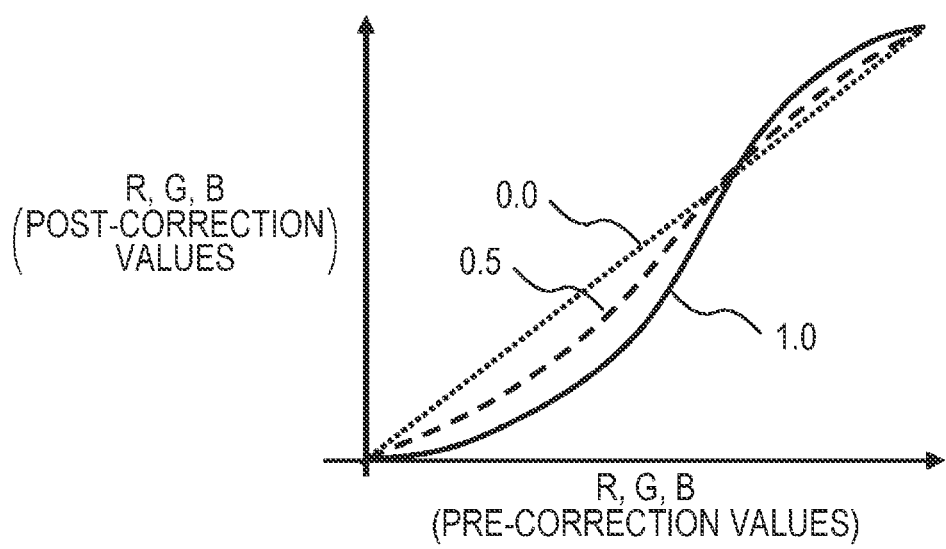
FIG. 12 is a graph illustrating a specific example of the image processing.

Hereinafter, the contrast adjustment that is an example of the image processing will be described with reference to FIG. 12. FIG. 12 illustrates pre-correction pixel values (that is, pixel values before the contrast adjustment is performed) and post-correction pixel values (that is, pixel values after the contrast adjustment is performed). The horizontal axis represents pre-correction pixel values, while the vertical axis represents post-correction pixel values. In an example of the pixel values, the values of R, G, and B are herein used. In another example, the values of Y, M, C, K, and other colors may be used.

In the graph in FIG. 12, the solid line represents a relationship between pre-correction R, G, and B values and post-correction R, G, and B values for contrast adjustment with the inference correctness probability of the object of 1.0 (100%). The graph represented with the solid line is obtained in such a manner that, for example, the adjustment amount is 1.0 and that the reference correction level for the contrast adjustment is multiplied by the adjustment amount of 1.0. The graph with the correctness probability of 1.0 is a curved graph but may be a linear graph (graph in the straight line form) or a graph including a straight line and a curve. A LUT corresponding to the graph represented with the solid line may be prepared in advance.

The broken line illustrated in FIG. 12 represents a relationship between pre-correction R, G, and B values and post-correction R, G, and B values for contrast adjustment with the inference correctness probability of the object of 0.5 (50%). The graph represented with the broken line is obtained in such a manner that, for example, the adjustment amount is 0.5 and that the reference correction level for the contrast adjustment is multiplied by the adjustment amount of 0.5. For example, the correction level for the contrast adjustment with the correctness probability of 0.5 is a half of the correction level for the contrast adjustment with the correctness probability of 1.0. The half value is merely an example, and the correction level may be decided by using a correction function or the like. The graph with the correctness probability of 0.5 is a curved graph but may be a linear graph (graph in the straight line form) or a graph including a straight line and a curve. A LUT corresponding to the graph represented with the broken line may be prepared in advance.

The dotted line illustrated FIG. 12 represents a relationship between pre-correction R, G, and B values and post-correction R, G, and B values for contrast adjustment with the inference correctness probability of the object of 0.0 (0.0%). The adjustment amount is 0.0, and the correction level for the contrast adjustment is 0.0. The post-correction R, G, and B values are identical to the pre-correction R, G, and B values. That is, an object having the correctness probability of 0.0 does not undergo the contrast adjustment.

Also in the case where the correctness probability is other than the probabilities described above, a graph for contrast adjustment is generated on the basis of the adjustment amount based on the probability.

When the inference correctness probability of an object to undergo the contrast adjustment is 1.0, the image processing unit 24 performs the contrast adjustment on the object on the basis of the graph represented with the solid line. In more detailed explanation, the image processing unit 24 receives the processing target image data 28 as the pre-correction image data and changes the R value (pre-correction R value) of the object represented in the image data 28 and to undergo the contrast adjustment to a post-correction R value on the basis of the relationship between the pre-correction R value and the post-correction R value. That is, the image processing unit 24 receives the pre-correction R value as an input value and outputs, as an output value, the post-correction R value associated with the pre-correction R value. The same applies to the G and B values. The image processing unit 24 generates and outputs image data 30 having the post-correction R, G, and B values.

When the inference correctness probability of the object to undergo the contrast adjustment is 0.5, the image processing unit 24 performs the contrast adjustment on the object on the basis of the graph represented with the broken line. In the same manner as in the case where the correctness probability is 1.0, the image processing unit 24 changes the respective pre-correction R, G, and B values to post-correction R, C, and B values and outputs image data 30 having the post-correction B, C, and B values.

When the inference correctness probability of the object to undergo the contrast adjustment is 0.0, the image processing unit 24 does not perform the contrast adjustment. That is, the pre-correction R, G, and B values (input values) are identical to the post-correction R, G, and B values (output values), and the image processing unit 24 outputs the input values as the output values without changing.

Figure 13:
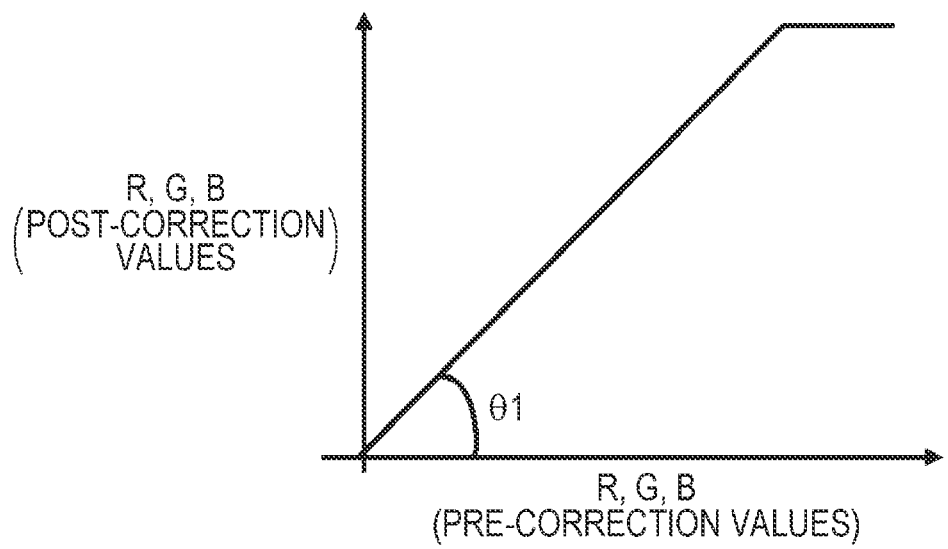
FIG. 13 is a graph illustrating a specific example of the image processing.
Figure 14:
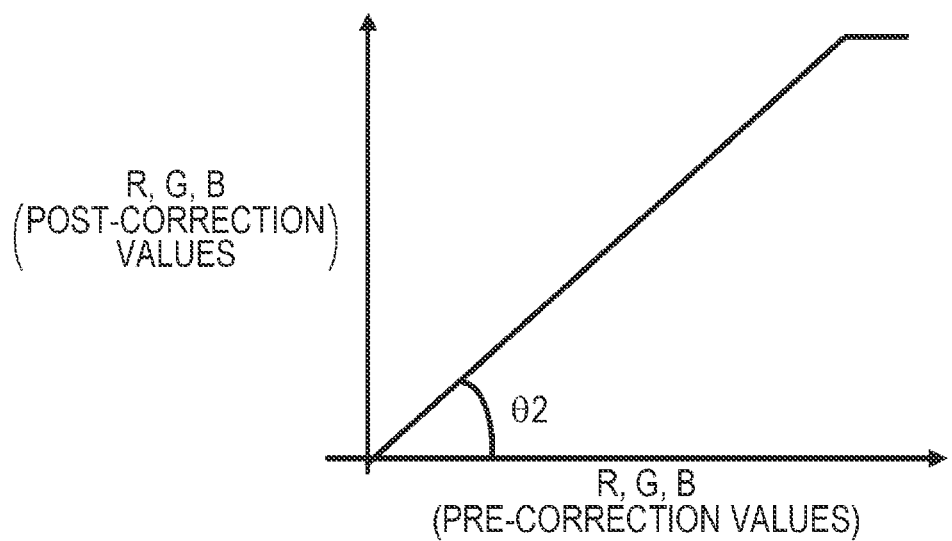
FIG. 14 is a graph illustrating a specific example of the image processing.
Figure 15:
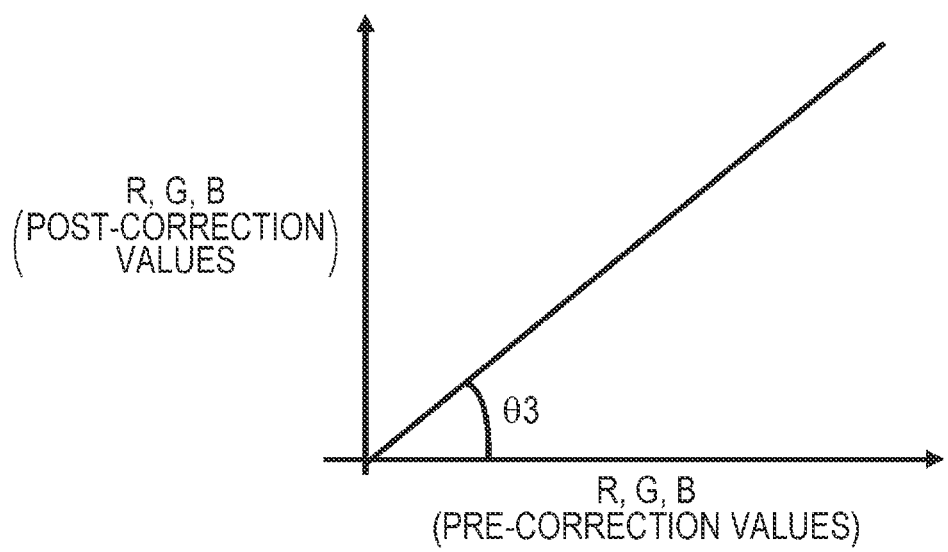
FIG. 15 is a graph illustrating a specific example of the image processing.

Hereinafter, the saturation enhancement that is an example of the image processing will be described with reference to FIGS. 13 to 15. FIGS. 13 to 15 each illustrate pre-correction pixel values (that is, pixel values before the saturation enhancement is performed) and post-correction pixel values (that is, pixel values after the saturation enhancement is performed). The horizontal axis represents pre-correction pixel values, while the vertical axis represents post-correction pixel values. In an example of the pixel values, the values of R, G, and B are herein used. In another example, the values of Y, M, C, K, and other colors may be used.

FIG. 13 illustrates a graph representing a relationship between pre-correction R, C, and B values and post-correction R, G, and B values for saturation enhancement with the inference correctness probability of the object of 1.0 (100%). The graph illustrated in FIG. 13 is obtained in such a manner that, that, for example, the adjustment amount is 1.0 and that the reference correction level for the saturation enhancement is multiplied by the adjustment amount of 1.0. The graph illustrated in FIG. 13 is a linear graph (graph in the straight line form). In a case where a graph inclination angle with respect to the horizontal axis representing the pre-correction pixel values is defined as θ, a graph inclination angle at the time of the correctness probability of 1.0 is θ1. The inclination angle θ1 is not 45 degrees, and thus the post-correction R, G, and B values are different from the pre-correction R, G, and B values. The graph may be a nonlinear graph (for example, a curved graph) or a graph including a straight line and a curve. A LUT corresponding to the graph illustrated in FIG. 13 may be prepared in advance.

FIG. 14 illustrates a graph representing a relationship between pre-correction R, G, and B values and post-correction R, G, and B values for saturation enhancement with the inference correctness probability of the object of 0.5 (50%). The graph illustrated in FIG. 14 is obtained in such a manner that, for example, the adjustment amount is 0.5 and that the reference correction level for the saturation enhancement is multiplied by the adjustment amount of 0.5. The graph illustrated in FIG. 14 is a linear graph (graph in the straight line form). The graph inclination angle at the time of the correctness probability of 0.5 is θ2. For example, the inclination angle θ2 is a half of the inclination angle θ1 at the time of the correctness probability pf 1.0. The inclination angle θ2 is not 45 degrees, and thus the post-correction R, G, and B values are different from the pre-correction R, G, and B values. The graph may be a nonlinear graph (for example, a curved graph) or a graph including a straight line and a curve. A LUT corresponding to the graph illustrated in FIG. 14 may be prepared in advance.

FIG. 15 illustrates a graph representing a relationship between pre-correction R, G, and B values and post-correction R, G, and B values for saturation enhancement with the inference correctness probability of the object of 0.0 (0.0%). The adjustment amount is 0.0, and the correction level for the saturation enhancement is 0.0. A graph inclination angle θ3 at the time of the correctness probability of 0.0 is 45 degrees, and thus the post-correction R, G, and B values are identical to the pre-correction R, G, and B values. That is, an object having the correctness probability of 0.0 does not undergo the saturation enhancement.

Also in the case where the correctness probability is other than the probabilities described above, a graph for saturation enhancement is generated on the basis of the adjustment amount based on the probability.

When the inference correctness probability of an object to undergo the saturation enhancement is 1.0, the image processing unit 24 performs the saturation enhancement on the object on the basis of the graph illustrated in FIG. 13. In more detailed explanation, the image processing unit 24 receives the processing target image data 28 as the pre-correction image data and changes the R value (pre-correction R value) of the object represented in the image data 28 and to undergo the saturation enhancement to a post-correction R value on the bass of the relationship between the pre-correction R value and the post-correction R value. That is, the image processing unit 24 receives the pre-correction R value as an input value and outputs, as an output value, the post-correction R value associated with the pre-correction R value. The same applies to the G and B values. The image processing unit 24 generates and outputs image data 30 having the post-correction R, G, and B values.

When the inference correctness probability of the object to undergo the saturation enhancement is 0.5, the image processing unit 24 performs the saturation enhancement on the object on the basis of the graph illustrated in FIG. 14. In the same manner as in the case where the correctness probability is 1.0, the image processing unit 24 changes the respective pre-correction R, G, and B values to post-correction R, G, and B values and outputs image data 30 having the post-correction R, G, and B values.

When the inference correctness probability of the object to undergo the saturation enhancement is 0.0, the image processing unit 24 does not perform the saturation enhancement. That is, the pre-correction R, G, and B values (input values) are identical to the post-correction R, G, and B values (output values), and the image processing unit 24 outputs the input values as the output values without changing.

Figure 16:
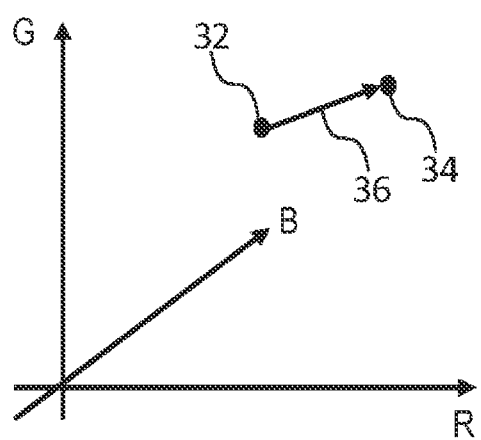
FIG. 16 is a view illustrating a specific example of the image processing.

Hereinafter, the color correction that is an example of the image processing will be described with reference to FIG. 16. For example, the flesh color correction will herein be described. FIG. 16 illustrates an example of a color space expressed using pixel values. In an example of the pixel values, the values of R, G, and B are herein used. FIG. 16 illustrates a three-dimensional color space constituted by R, G, and B. In another example, the values of Y, M, C, K, and other colors may be used as the pixel values.

Pixel values (R1, G1, B1) denoted by a reference numeral 32 are the pixel values of an object (for example, the face of a person) represented in the processing target image data 28 and to undergo the flesh color correction. That is, the pixel values (R1, G1, P1) are the pixel values of the skin before the flesh color correction is performed.

Pixel values (R2, G2, P2) denoted by a reference numeral 34 are pixel values for expressing an idealistic flesh color. The pixel values (R2, G2, P2) are the pixel values of the skin after the flesh color correction is performed. The idealistic flesh color and pixel values for expressing the idealistic flesh color are specified in advance.

Correction amount vectors (dR, dG, dB) denoted by a reference numeral 36 are vectors for converting the pre-correction pixel values (R1, G1, B1) to the post-correction pixel values (R2, G2, B2) serving as the idealistic pixel values.

When the inference correctness probability of an object to undergo the flesh color correction is 1.0 (100%), the image processing unit 24 performs the flesh color correction on the object on the basis of the correction amount vectors (dR, dG, dP) denoted by the reference numeral 36.

When the inference correctness probability of the object to undergo the flesh color correction is 0.5 (50%), the image processing unit 24 performs the flesh color correction on the object on the basis of correction amount vectors obtained by multiplying the correction amount vectors (dR, dG, dB) denoted by the reference numeral 36 by 0.5.

When the inference correctness probability the object to undergo the flesh color correction 0.0 (0.0%), the image processing unit 24 does not perform the flesh color correction.

Also in the case where the correctness probability is other than the probabilities described above, the correction amount vectors are calculated on the basis of the adjustment amount based on the probability.

For example, if the object is inferred as a person, and if the inference correctness probability is 0.5, the flesh color correct performed on the color of the object by using a level lower than the level for the probability of 1.0. When the object is a person, the color of the object is expressed in a color more similar to the flesh color than that in a case where the flesh color correction is not performed at all. Although the degree of the flesh color correction is lower than that with the level for the probability 1.0, the object is represented in a color more similar to the flesh color than that in the case where the fresh color correction is not performed at all. If the object is not a person, the flesh color correction is performed on an object inappropriate for the flesh color correction, but inappropriateness of the image processing is reduced as compared to the case where the flesh color correction is performed in accordance with the level for the probability of 1.0. Chancing the correction level on the basis of the correctness probability may lead to generation of mage data representing an object more appropriately than in such processing that involves the flesh color correction performed in accordance with the level based on the probability of 1.0 or that involves no flesh color correction at all.

The flesh color correction has heretofore been described in the example; however, the sky color correction may be performed in the same manner. In this case, the pixel values (R1, G1, B1) denoted by the reference numeral 32 are pixel values of an object (for example, the sky) represented in the image data 28 and to undergo the sky color correction. The pixel values C2, B2) denoted by the reference numeral 34 are pixel values for expressing an idealistic sky color. The idealistic sky color and the pixel values for expressing the idealistic sky color are specified in advance. In the same manner as in the flesh color correction, the image processing unit 24 performs the sky color correction on the object by using the correction amount vectors based on the inference correctness probability of the object to undergo the sky color correction.

The white balance adjustment, the contrast adjustment, the saturation enhancement, and the color correction that are described above are merely examples of the image processing. For example, sharpness adjustment or smoothing may be performed on the processing target image data 28 as image processing other than the afore-mentioned image processing.

For example, a sharpness filter for performing idealistic sharpness adjustment and a smoothing filter for performing idealistic smoothing are generated.

When the inference correctness probability of an object to undergo the sharpness adjustment is 1.0 (100%), the image processing unit 24 applies the idealistic sharpness filter to the object. When the inference correctness probability of the object to undergo the sharpness adjustment is 0.5 (50%), the image processing unit 24 applies, to the object, a filter obtained by multiplying the value of the idealistic sharpness filter by the adjustment amount of 0.5. When the inference correctness probability of the object to undergo the sharpness adjustment is 0.0 (0.0%), the image processing unit 24 does not perform the sharpness adjustment.

The same applies to the smoothing. That is, when the inference correctness probability of an object to undergo the smoothing is 1.0, the image processing unit 24 apples the idealistic smoothing filter to the object. When the probability is 0.5, the image processing unit 24 applies, to the object, a filter obtained by multiplying the value of the idealistic smoothing filter by the adjustment amount of 0.5. When the probability is 0.0, the image processing unit 24 does not perform the smoothing. The same applies to a case where the probability has a value other than these values.

Hereinafter, a user interface provided in this exemplary embodiment will be described with reference to FIGS. 17 to 22. FIGS. 17 to 22 illustrate screens that are examples of the user interface.

The processor 18 provides a user interface (for example, screens) in order for the user to control the correction levels. The user interface is displayed, for example, on the display of the image processing apparatus 10. The user interface may be displayed on the display of a terminal apparatus (for example, a PC) used by the user after data for the user interface is transmitted from the image processing apparatus 10 to the terminal apparatus. Further, the processor 18 may reflect a correction level based on the correctness probability of an object on the user interface.

Figure 17:
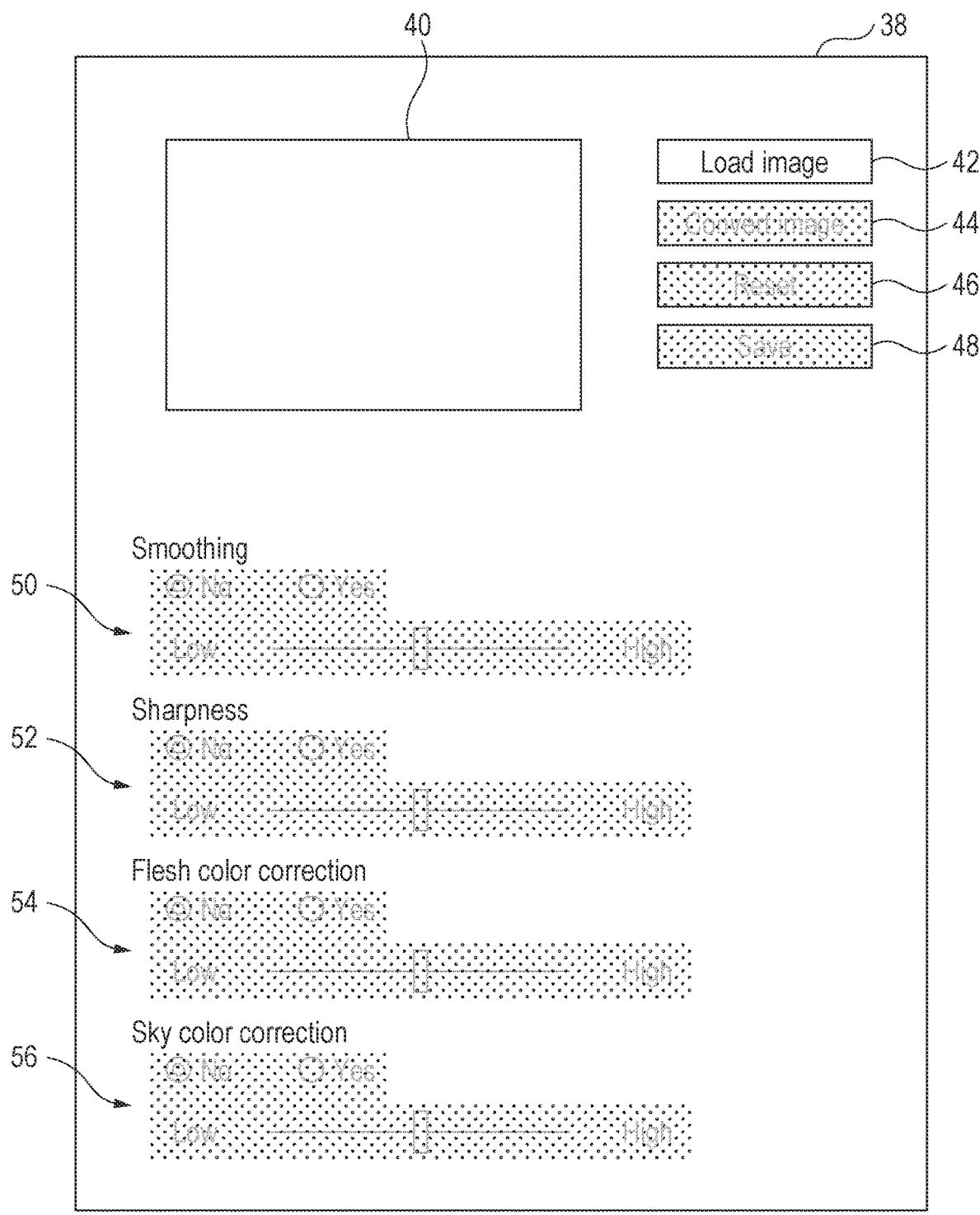
FIG. 17 is a view illustrating an example of a user interface.

A screen 38 illustrated in FIG. 17 is a screen for representing a state before the image processing apparatus 10 receives processing target image data 28. The screen 38 is displayed on the display.

The screen 38 is provided with a display area 40. In response to the image processing apparatus 10 receiving the processing target image data 28, an image based on the image data 28 is displayed in the display area 40.

Buttons 42, 44, 46, and 48 are displayed on the screen 38.

The button 42 is a button for an instruction to load the image data 28. In response to the user pressing the button. 42, the image processing apparatus 10 loads the processing target image data 28. An image based on the image data 28 is displayed in the display area 40.

The button 44 is a button for an instruction to perform image conversion (that is, to perform the image processing described above). In response to the user pressing the button 44, the image processing apparatus 10 performs the image processing on the processing target image data 28.

The button 46 is a button for resetting image processing settings designated from the screen 38. The button 48 is a button for saving the image processing settings designated from the screen 38. The image processing settings include, for example, a setting of whether to perform the image processing and settings of the correction levels. In response to the user pressing the button 46, the image processing settings designated from the screen 38 are reset. In response to the user pressing the button 48, the image processing settings designated from the screen 38 are saved.

In addition, items 50, 52, 54, and 56 for setting the image processing levels are displayed on the screen 38. The item 50 is an item for setting a smoothing level; the item 52, a sharpness adjustment level; the item 54, a flesh color correction level; and the item 56, a sky color correction level. For example, the user sets each image processing level. Each item includes radio buttons for an instruction as to whether to perform the image processing and a setting slider for setting the correction level.

If the image processing apparatus 10 has not loaded the image data 28, the processor 18 displays, for example, the button 42 as an operable object and the buttons other than the button 42 and the items as inoperable objects. For example, the processor 18 grays out the buttons other than the button 42 and the items and displays the button 42 in an ordinary display state allowing operation, not in the grayout state. FIG. 17 illustrates how the buttons and the items are displayed. The processor 18 receives the pressing of the button 42 but does not receive the pressing of the buttons other than the button 42 and operations for setting the respective items. The processor 18 does not have to display the buttons other than the button 42 and the items on the screen 38.

In response to the user pressing the button 42, the processor 18 loads the processing target image data 28. For example, the processor 18 may receive image data 28 generated by scanning a document. In another example, the processor 18 may receive processing target image data 28 via a communication path such as the Internet or a storage medium.

Figure 18:
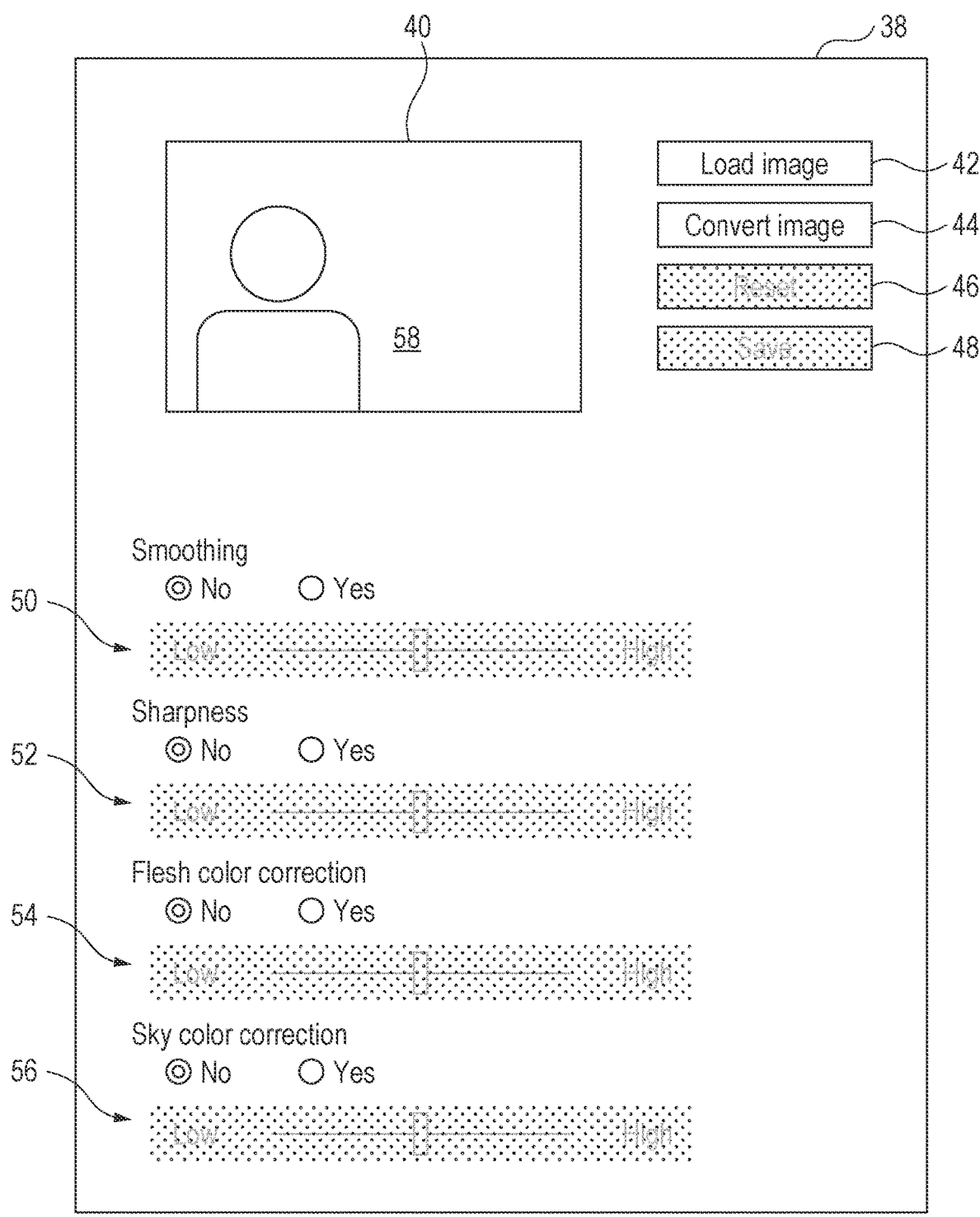
FIG. 18 is a view illustrating an example of the user interface.

In response to the image processing apparatus 10 loading the image data 28, an image 58 based on the image data 28 is displayed in the screen 38 as illustrated in FIG. 18. In this case, for example, the image 58 represents a person and other solid bodies, and the scene represented in the image 58 is an outdoor scene without the sky. The image displayed in the image 58 at this stage is an image before undergoing the image processing.

After the image data 28 is loaded by the image processing apparatus 10, and before the image processing is performed, the processor 18 displays the buttons 42 and 44 as operable objects and the buttons other than the buttons 42 and 44 as inoperable objects. For example, the processor 18 grays out the buttons other than the buttons 42 and 44 and displays the buttons 42 and 44 in the ordinary display state allowing operation, not in the grayout state.

For each of the items 50, 52, 54, and 56, the processor 18 displays the radio buttons for an instruction as to whether to perform the image processing assigned to the item as operable objects and the setting slider for setting the correction level as an inoperable object. For example, the processor 18 grays out the setting slider and displays the radio buttons in the ordinary display state allowing operation, not in the grayout state. In the example illustrated in FIG. 18, the instruction "do not perform the image processing" is designated by using the radio button in each item.

In response to the user pressing the button 44 to thereby instruct the processor 18 to perform the image processing from the screen 38 illustrated in FIG. 18, the processor 18 performs the image processing on the processing target image data 28 and thereby generates image data 30 resulting from the image processing (that is, after the correction).

Figure 19:
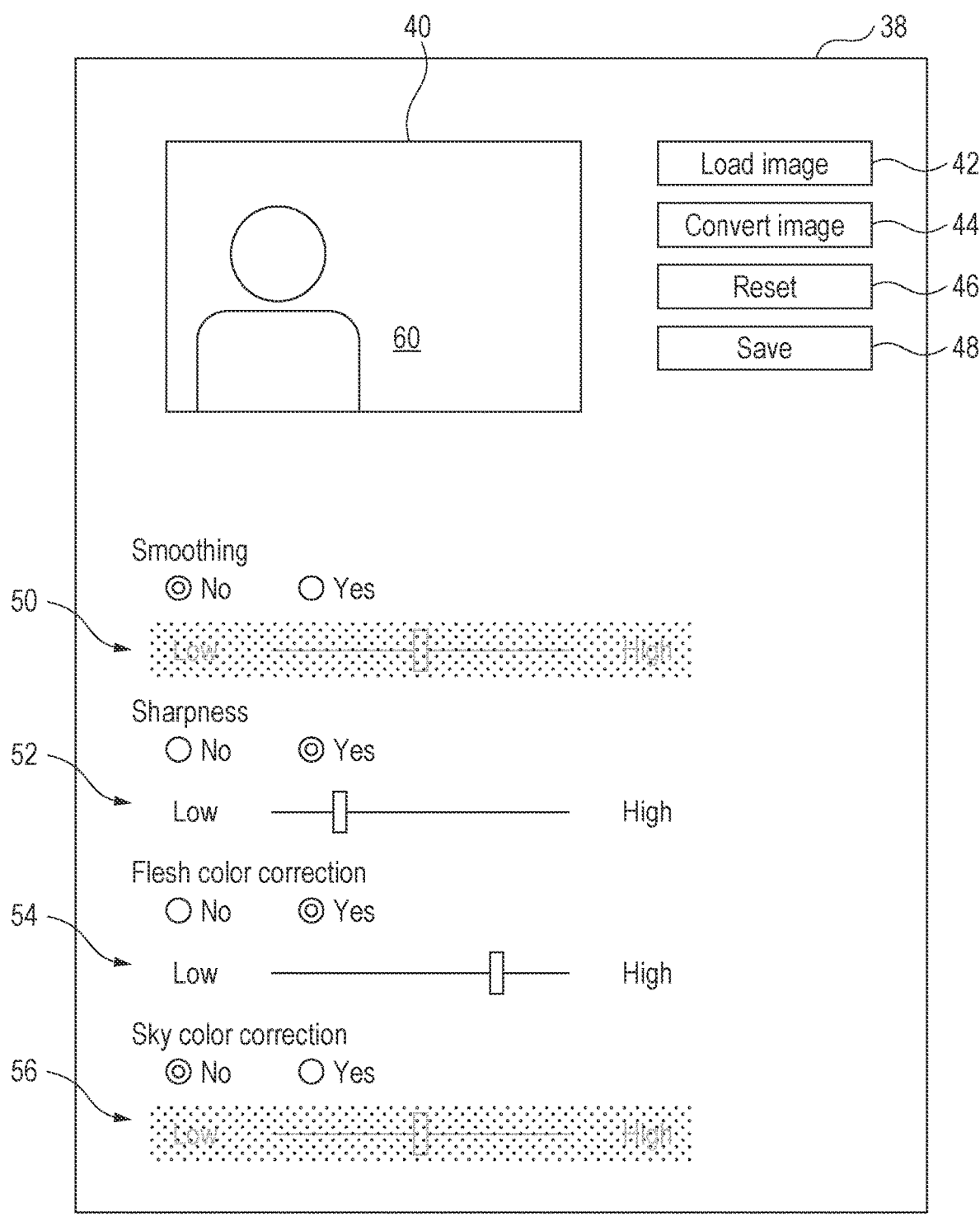
FIG. 19 is a view illustrating an example of the user interface.

As illustrated in FIG. 19, an image 60 based on the image data 30 resulting from the image processing is displayed in the display area 40.

After receiving the image data 28, the processor 18 performs the above-described processing by the determination unit 22. That is, the processor 18 infers each object represented in the image data 28 and calculates the inference correctness probability of the object. Further, the processor 18 decides image processing associated with the inferred object, determines an adjustment amount based on the correctness probability, and calculates a correction level on the basis of the determined adjustment amount. The correction level based on the correctness probability may be specified in advance as described above. The processing by the determination unit 22 may be performed before the button 44 is pressed after the processor 18 receives the image data 28. The processing may be performed after the button 44 is pressed.

Further, the processor 18 performs the above-described processing by the image processing unit 24. That is, for each object represented in the image data 28, the processor 18 performs the image processing associated with the object on the object in accordance with the correction level based on the inference correctness probability of the object. As the result, the image data 30 is generated, and the image 60 based on the image data 30 is displayed in the display area 40.

After performing the image processing, the processor 18 displays the buttons 42, 44, 46, and 48 as operable objects. For example, the processor 18 displays the buttons 42, 44, 46, and 48 in the ordinary display state allowing operation, not in the grayout state.

The processor 18 also reflects the result of the processing by the determination unit 22 on the screen 38 serving as, the user interface. For example, the processor 18 reflects whether to perform the image processing and the correction level thereof on the screen 38.

In the example illustrated in FIG. 19, the determination unit 22 determines that the smoothing and the sky color correction are not to be performed. That is, it is determined that the inference correctness probability of the object to undergo the smoothing is 0.0% and that the inference correctness probability of the object to undergo the sky color correction is also 0.0%. In other words, it is inferred that the processing target image data 28 does not represent an object to undergo the smoothing and an object (for example, the sky) to undergo the sky color correction. In this case, the instruction "do not perform the image processing" is automatically selected from the radio buttons for each of the smoothing and the sky color correction. The processor 18 also displays the respective setting sliders for the smoothing and the sky color correction as inoperable objects (for example, in the grayout state).

In addition, the determination unit 22 has determined that the sharpness adjustment and the flesh color correction are to be performed. That is, the determination unit 22 has determined that the inference correctness probability of the object to undergo the sharpness adjustment has a value exceeding 0.0% and that the inference correctness probability of the object to undergo the flesh color correction also has a value exceeding 0.0%. In other words, it is inferred that the processing target image data 28 represents the object to undergo the sharpness adjustment and the object to undergo the flesh color correction. In this case, the instruction "perform the image processing" is automatically selected from the radio buttons of each of the sharpness adjustment and the flesh color correction.

The processor 18 also displays the respective setting sliders for the sharpness adjustment and the flesh color correction as operable objects. That is, the processor 18 displays the respective setting sliders for the sharpness adjustment and the flesh color correction in the ordinary display state allowing operation, not in the grayout state.

The processor 18 also reflects the correction level of each of the sharpness adjustment and the flesh color correction decided by the determination unit 22 on the corresponding setting slider. As a correction level becomes higher, a setting point closer to High than to Low is selected on the setting slider. For example, since the sharpness correction level is low, a setting point closer to Low than to High is selected on the setting slider. Since the flesh color correction level is high, a setting point closer to High is selected on the setting slider.

For example, the objects "person" and "vehicle" are inferred as objects represented in the image data 28. The image processing associated with the object "person" is the flesh color correction, and the image processing associated with the objet "vehicle" is the sharpness adjustment. In addition, the object "person" has a high correctness probability, and thus the flesh color correction level set high. The object "vehicle" has a low correctness probability, and thus the sharpness correction level is set low. The settings as described above are reflected on the respective items on the screen 38. The image processing unit 24 perform the sharpness adjustment and the flesh color correction on the processing target image data 28 in accordance with the settings.

Note that if the user gives an instruction to perform the smoothing by operating the corresponding radio button for the smoothing on the screen 38 illustrated FIG. 19 and sets the correction level by using the setting slider for the smoothing, the image processing unit 24 performs the smoothing on the processing target mage data 28 in accordance with the setting.

In response to the user pressing the button 46 for resetting on the screen 38 illustrated FIG. 19, the screen 38 returns to the screen 38 illustrated in FIG. 18. The buttons 44 and 46 may be used as buttons for giving an instruction as to whether to perform the image processing.

Figure 20:
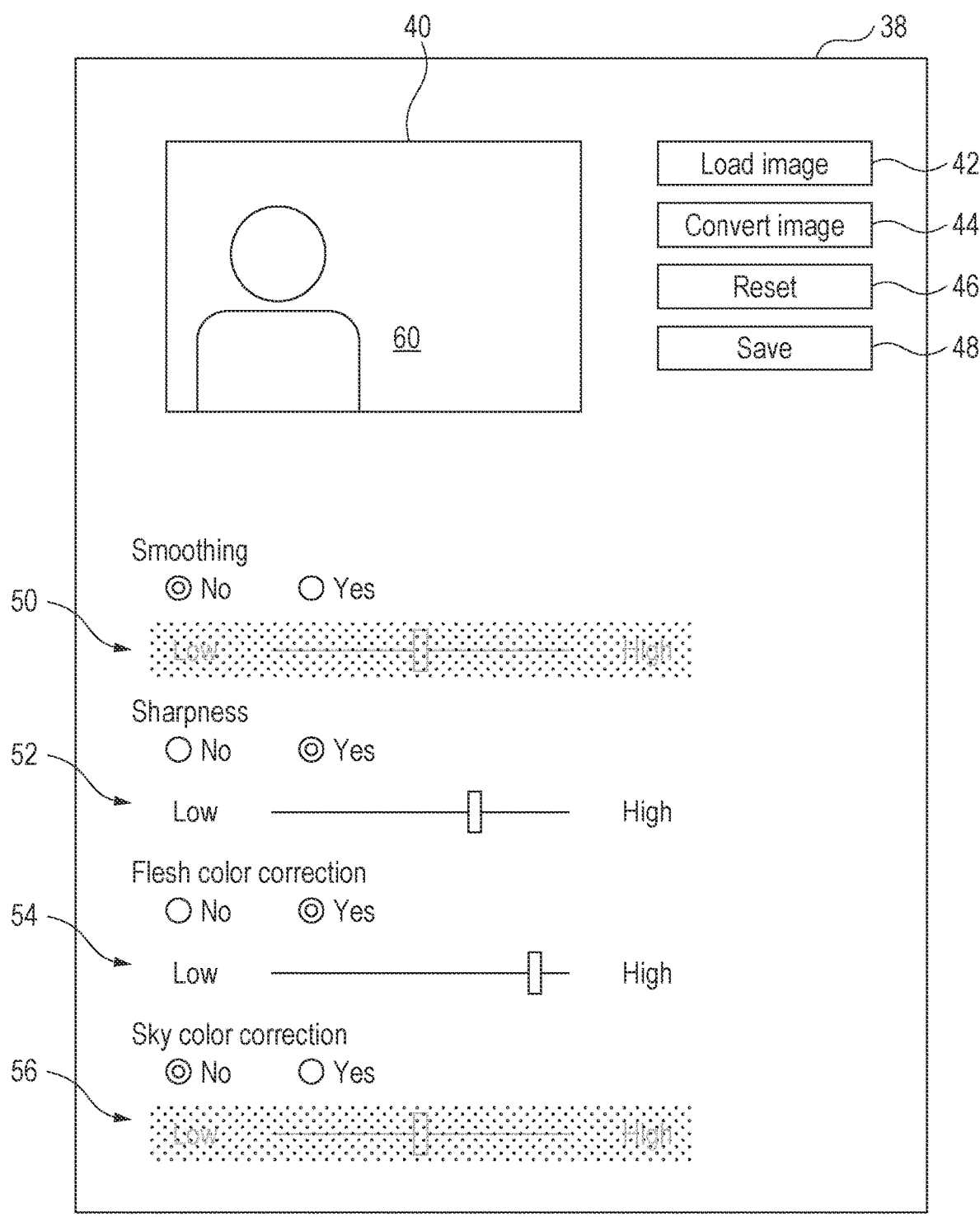
FIG. 20 is a view illustrating an example of the user interface.

The user may change the sharpness correction level and the flesh color correction level from the screen 38 illustrated in FIG. 19. FIG. 20 illustrates a state after the user changes the correction levels. In this case, for example, the respective levels of the sharpness adjustment and the flesh color correction are each set at a point closer to High than before.

As illustrated in FIG. 20, in response to the user changing the correction levels, the processor 18 performs the sharpness adjustment and the flesh color correction on the processing target image data 28 in accordance with the levels after the change and generates post-correction image data 30. The image 60 based on the image data 30 is displayed in the display area 40. The image 60 displayed at this time is an image on which the correction levels designated by the user are reflected.

Figure 21:
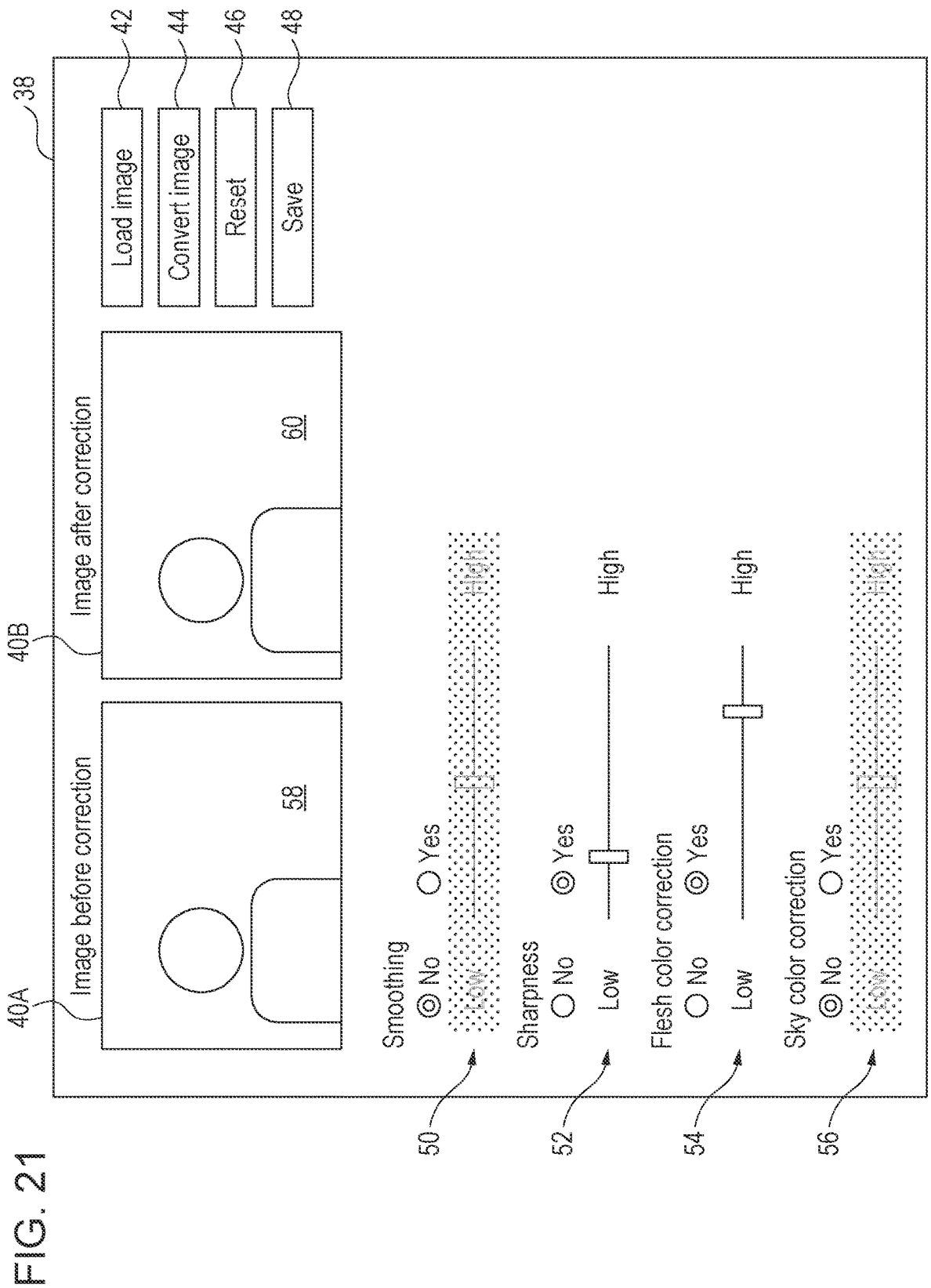
FIG. 21 is a view illustrating an example of the user interface.

In addition, as illustrated in FIG. 21, the processor 18 may display the pre-correction image 58 and the post-correction image 60 side by side on the screen 38. The screen 38 is provided with a display area 40A and a display area 40B that are arranged side by side and in which a pre-correction image and a post-correction image are displayed, respectively. The pre-correction image 58 is displayed in the display area 40A, and the post-correction image 60 is displayed in the display area 40B. As described above, the images 58 and 60 may be displayed side by side to enable the images 58 and 60 to be visually compared.

The processing target image data 28 may be image data having multiple pages. In this case, images of all or some of the pages are displayed on the screen 38. Hereinafter, the processing will be described with reference to FIG. 22.

Figure 22:
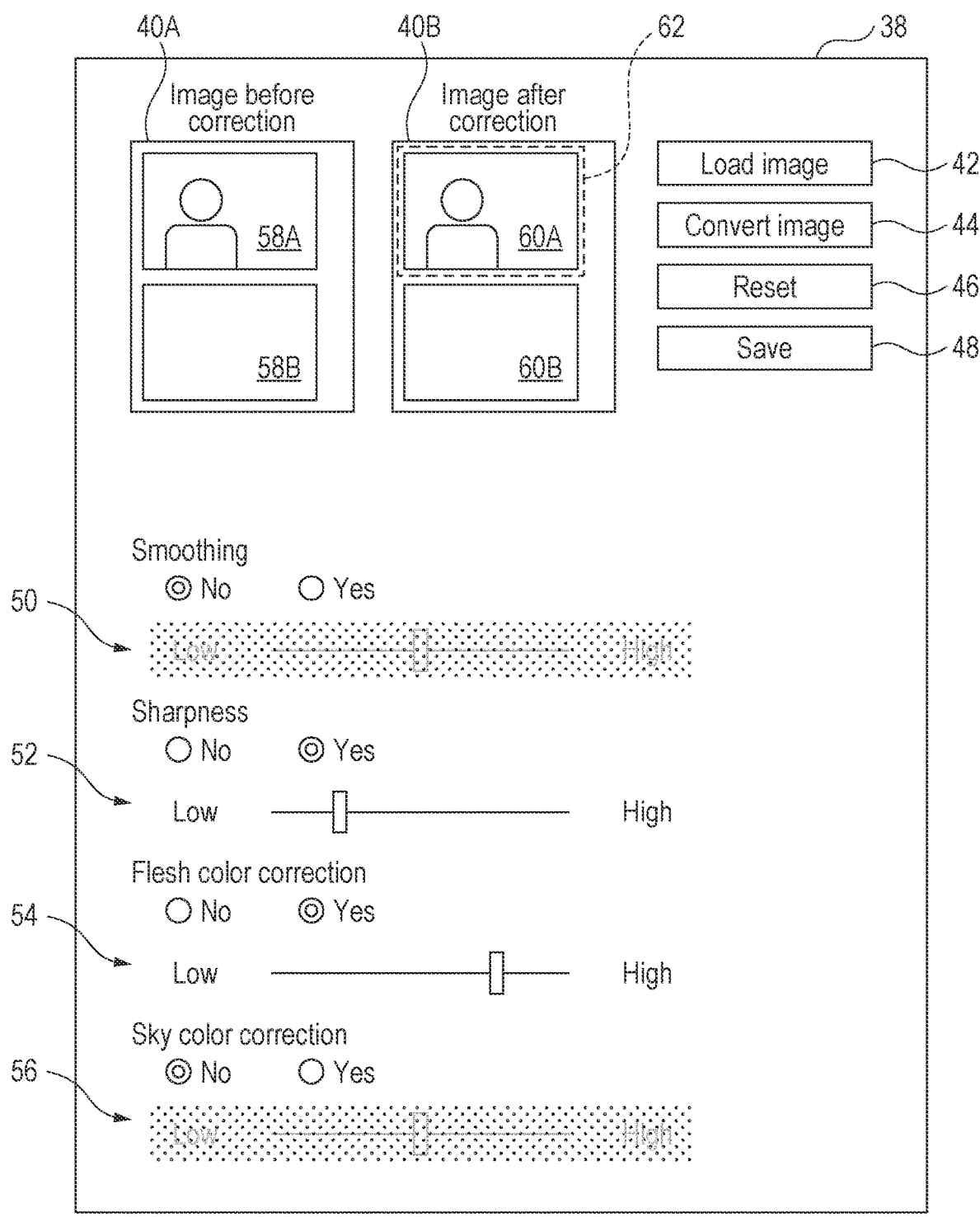
FIG. 22 is a view illustrating an example of the user interface.

As illustrated in FIG. 22, the screen 38 is provided with the display area 40A and the display area 40B. Images (for example, images 58A and 58B) of pages included in the pre-correction image data 28 are displayed in the display area 40A. Images (for example, images 60A and 60B) of pages included in the post-correction image data 30 are displayed in the display area 40B. Images of all or some of the pages may be displayed in the display areas 40A and 40B.

The post-correction image 60A is an image venerated by performing the image processing decided by the determination unit 22 on the pre-correction image 56A. The post-correction image 60B is an image generated by performing the image processing determined by the determination unit 22 on the pre-correction image 58B.

In addition, in response to the user designating a post-correction image on the screen 38, the processor 18 reflects, on the screen 38, the image processing performed on the corresponding pre-correction image to generate the post-correction image and the correction level for the image processing at that time.

For example, as denoted by a reference numeral 62, the post-correction image 60A has been designated by the user. In this case, the processor 18 reflects, on the screen 38, the image processing performed on the pre-correction image 58A and the correction level for the image processing at that time. For example, the sharpness adjustment and the flesh color correction have been performed. The sharpness correction level is reflected or the setting slider of the item 52, and the flesh color correction level is reflected on the setting slider of the item 54.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to
   infer an object represented in image data to be processed, the object being inferred by using a learning model for inferring the object represented in the image data, wherein the object includes a first object and a second object in the image data, and
   perform image processing on the image data with a correction level of the image processing for correcting the image data being varied on a basis of a probability of correctness in inference of the object, wherein the first object is processed with a first image processing, and the second object is processed with a second image processing, and the first and second image processings are different types of image processing predetermined in advance on a per-object basis,
   wherein an adjustment amount provided for deciding the correction level and based on the probability of correctness is specified,
   wherein a first adjustment amount based on a first probability of correctness is larger than a second adjustment amount based on a second probability of correctness, wherein the second probability is lower than the first probability, and the adjustment amount based on a probability in a range from the second probability to the first probability is fixed or increases in the range from the second probability to the first probability, and
   wherein the processor is configured to correct the image data in accordance with a correction level decided on a basis of an adjustment amount based on the probability of correctness.

2. The information processing apparatus according to claim 1,
   wherein the processor is configured to
   lower the correction level as the probability of correctness lowers.

3. The information processing apparatus according to claim 1,
   wherein the processor is configured to
   vary the correction level depending on the object.

4. The information processing apparatus according to claim 1,
   wherein the processor is further configured to
   vary the image processing depending on the object.

5. The information processing apparatus according to claim 2, wherein the processor is further configured to
vary the image processing depending on the object.

6. The information processing apparatus according to claim 3,
wherein the processor is further configured to
vary the image processing depending on the object.

7. The information processing apparatus according to claim 1,
wherein the processor is further configured to
provide a user interface in order for a user to control the correction level and
reflect the correction level based on the probability of correctness on the user interface.

8. The information processing apparatus according to claim 2,
wherein the processor is further configured to
provide a user interface in order for a user to control the correction level and
reflect the correction level based on the probability of correctness on the user interface.

9. The information processing apparatus according to claim 3,
wherein the processor is further configured to
provide a user interface in order for a user to control the correction level and
reflect the correction level based on the probability of correctness on the user interface.

10. The information processing apparatus according to claim 4,
wherein the processor is further configured to
provide a user interface in order for a user to control the correction level and
reflect the correction level based on the probability of correctness on the user interface.

11. The information processing apparatus according to claim 1,
wherein the processor is further configured to perform calculation of a lookup table (LUT) for the probability of correctness in inference of the object.

12. The information processing apparatus according to claim 1,
wherein the processor is further configured to perform calculation with a lookup table (LUT) provided in advance for the probability of correctness in inference of the object.

13. The information processing apparatus according to claim 1,
wherein the adjustment amount based on the probability in the range from the second probability to the first probability increases linearly with the increase of the correctness probability in the range from the second probability to the first probability.

14. The information processing apparatus according to claim 1,
wherein the correction level is the degree of correction or the amount of correction.

15. The information processing apparatus according to claim 1,
wherein the correction level is obtained by multiplying a predetermined reference level by an adjustment amount based on the probability.

16. The information processing apparatus according to claim 1,
wherein the image processing on the image data comprises white balance adjustment, contrast adjustment, sharpness adjustment, smoothing, saturation enhancement, or correction of the color of an object.

17. A non-transitory computer readable medium storing a program causing a computer to execute a process comprising:
inferring an object represented in image data to be processed, the object being inferred by using a learning model for inferring the object represented in the image data, wherein the object includes a first object and a second object in the image data; and
performing image processing on the image data with a correction level of the image processing for correcting the image data being varied on a basis of a probability of correctness in inference of the object, wherein the first object is processed with a first image processing, and the second object is processed with a second image processing, and the first and second image processings are different types of image processing predetermined in advance on a per-object basis,
wherein an adjustment amount provided for deciding the correction level and based on the probability of correctness is specified,
wherein a first adjustment amount based on a first probability of correctness is larger than a second adjustment amount based on a second probability of correctness, wherein the second probability is lower than the first probability, and the adjustment amount based on a probability in a range from the second probability to the first probability is fixed or increases in the range from the second probability to the first probability, and
wherein the image data is corrected in accordance with a correction level decided on a basis of an adjustment amount based on the probability of correctness.

18. The non-transitory computer readable medium according to claim 17, wherein the adjustment amount based on the probability in the range from the second probability to the first probability increases linearly with the increase of the correctness probability in the range from the second probability to the first probability.

\* \* \* \* \*